United States Patent

Hock et al.

[11] Patent Number: 5,458,366
[45] Date of Patent: Oct. 17, 1995

[54] COMPARTMENTALIZED AIRBAG KNEE BOLSTER

[75] Inventors: Christopher Hock, Uintah; Gregory J. Lang, Ogden, both of Utah

[73] Assignee: Morton International, Inc., Chicago, Ill.

[21] Appl. No.: 252,443

[22] Filed: Jun. 1, 1994

[51] Int. Cl.⁶ .................. B60R 21/045; B60R 21/22; B60R 21/24
[52] U.S. Cl. .................. 280/729; 280/730.1; 280/753
[58] Field of Search .................. 280/729, 730 R, 280/732, 730 A, 752, 753, 743 R, 743 A, 736, 740, 742, 728 R, 728 B, 731, 730.1, 730.2, 743.1, 743.2, 728.1, 728.3

[56] References Cited

U.S. PATENT DOCUMENTS

| 3,451,694 | 6/1969 | Hass | 280/743 R |
|---|---|---|---|
| 3,614,127 | 10/1971 | Glance | 280/729 |
| 3,618,978 | 11/1971 | Klove, Jr. et al. | 280/730 R |
| 3,733,091 | 5/1973 | Fleck et al. | 280/729 |
| 3,784,225 | 1/1974 | Fleck et al. | 280/729 |
| 3,792,873 | 2/1974 | Buchner et al. | 280/743 R |
| 3,799,573 | 3/1974 | McDonald | 280/740 |
| 3,817,553 | 6/1974 | Wilfert | 280/752 |
| 3,837,669 | 9/1974 | Nagazumi et al. | 280/728 R |
| 3,945,665 | 3/1976 | Tsutsumi et al. | 280/731 |
| 4,198,075 | 4/1980 | Kob et al. | 280/753 |
| 4,948,168 | 8/1990 | Adomeit et al. | 280/732 |

FOREIGN PATENT DOCUMENTS

| 2035742 | 1/1972 | Germany | 280/731 |
|---|---|---|---|
| 4197847 | 7/1992 | Japan | 280/753 |
| 5131889 | 5/1993 | Japan | 280/729 |
| 5208646 | 8/1993 | Japan | 280/730 R |
| 6032195 | 2/1994 | Japan | 280/753 |

Primary Examiner—Margaret A. Focarino
Assistant Examiner—Peter C. English
Attorney, Agent, or Firm—George W. Rauchfuss, Jr.; Gerald K. White

[57] ABSTRACT

A compartmentalized airbag knee bolster device is mounted to the instrument panel of a vehicle for restraining forward movement of the knees of the front seat occupants. The device contains a plenum chamber attached to an inflator for pressurizing the plenum chamber. A plurality of airbag compartments are in communication with the plenum chamber by a plurality of one way valves. A knee bolster panel is positioned in front of the plenum chamber with the compartments of the airbag situated therebetween. On inflation of the compartmentalized airbag, the knee bolster panel contacts the front of the knees of a vehicle occupant to restrain forward knee movement. The pressure in the compartments behind the area of the knee bolster panel engaged by the occupant's knees increases in the contacted compartments, and accordingly the rigidity of the airbag in the proximate area of contact with the knees.

5 Claims, 2 Drawing Sheets

FIG. 2
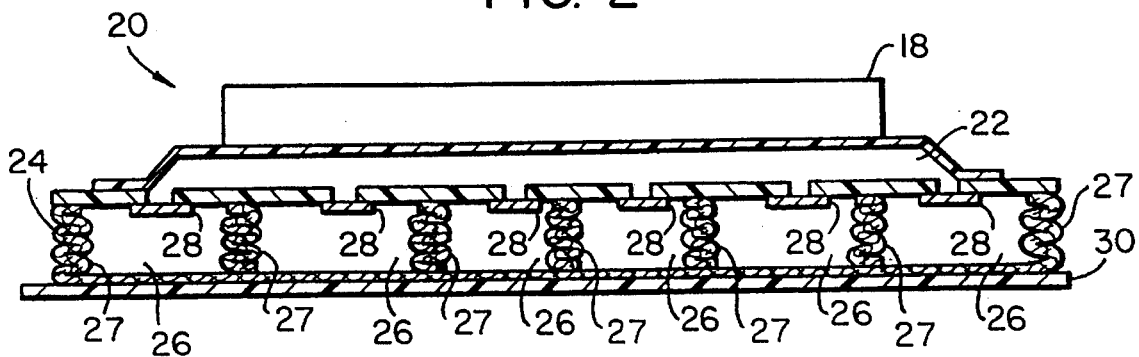
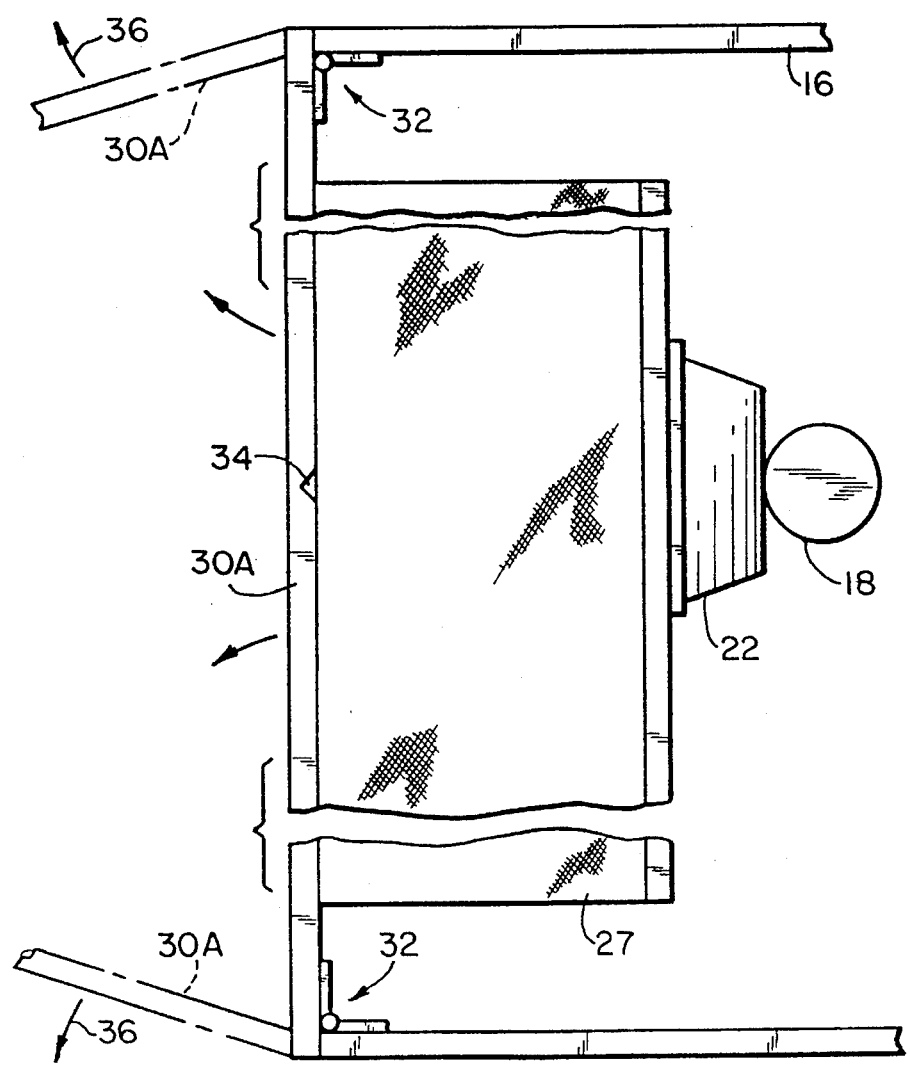
FIG. 4

COMPARTMENTALIZED AIRBAG KNEE BOLSTER

FIELD OF THE INVENTION

This invention relates to a knee bolster unit for a motor vehicle restraint system and more particularly to an airbag activated knee bolster unit.

BACKGROUND OF THE INVENTION

This invention relates to a vehicular airbag restraint device, and more particularly to such a device having a compartmentalized airbag knee bolster which increases the pressure on areas of contact with the knees of a vehicle's occupant, thereby restraining forward motion of the knees.

When a vehicle is involved in a frontal crash, the occupants in the front seat are driven forward. To prevent the occupants from submarining under or sliding into the instrument panel, their knees must be restrained from forward translation. This may be accomplished by placing a knee bolster in front of the position the knees will be in prior to their forward translation. However, reactive type knee bolsters which function on the principal of a single compartment airbag have the disadvantage that on impact of the knees with the airbag, the airbag loses rigidity in the impact area. This is due to gas flowing from the impact area of the bag to other areas within the airbag. Accordingly, the effectiveness of the airbag is reduced due to low rigidity of the airbag in the impact area.

SUMMARY OF THE INVENTION

Accordingly, it is an object of this invention to provide a new and improved airbag knee bolster which overcomes the aforesaid problem and improves the effectiveness of the airbag knee bolster.

Another object of this invention is to provide a new and improved airbag knee bolster for restraining forward movement of the vehicle occupants by increasing the pressure on the knees in the area of contact.

In carrying out this invention in one illustrative embodiment thereof, a compartmentalized airbag knee bolster device has a plenum chamber with an inflator attached thereto for applying pressure to said plenum chamber upon actuation of the inflator by an appropriate sensor. The compartmentalized airbag has a plurality of compartments, each having a one way valve for providing communication of pressurized gas from the plenum chamber to the compartments. A knee bolster panel is positioned on the front surface of the compartmentalized airbag. The airbag knee bolster device is mounted to the instrument panel in a manner such that the bolster panel is adapted to contact the front of the knees of the vehicle occupants when the compartmentalized airbag is inflated. The compartmentalized airbag knee bolster device provides for increasing the pressure in the contacted compartments for improved restraining of forward movement of the knees. In one form, a solid bolster panel contacts the front of the knees, while in another form the bolster separates and the compartmentalized airbag directly engages the knees of an occupant.

BRIEF DESCRIPTION OF THE DRAWINGS

The invention, together with further objects, features, advantages and aspects thereof, will be more clearly understood from the following description taken in connection with the accompanying drawings.

FIG. 2 is a top cross-sectional view of the compartmentalized airbag knee bolster device in accordance with the present invention prior to expansion of the compartmentalized airbag by pressurized gas.

FIG. 4 is a side cross-sectional view of another embodiment of a compartmentalized airbag knee bolster device but with the knee bolster panel having a tear seam and being hinged to the vehicle instrument panel for permitting the compartmentalized airbag to directly contact the knees of an occupant.

DESCRIPTION OF THE PREFERRED EMBODIMENTS

Figure 1:
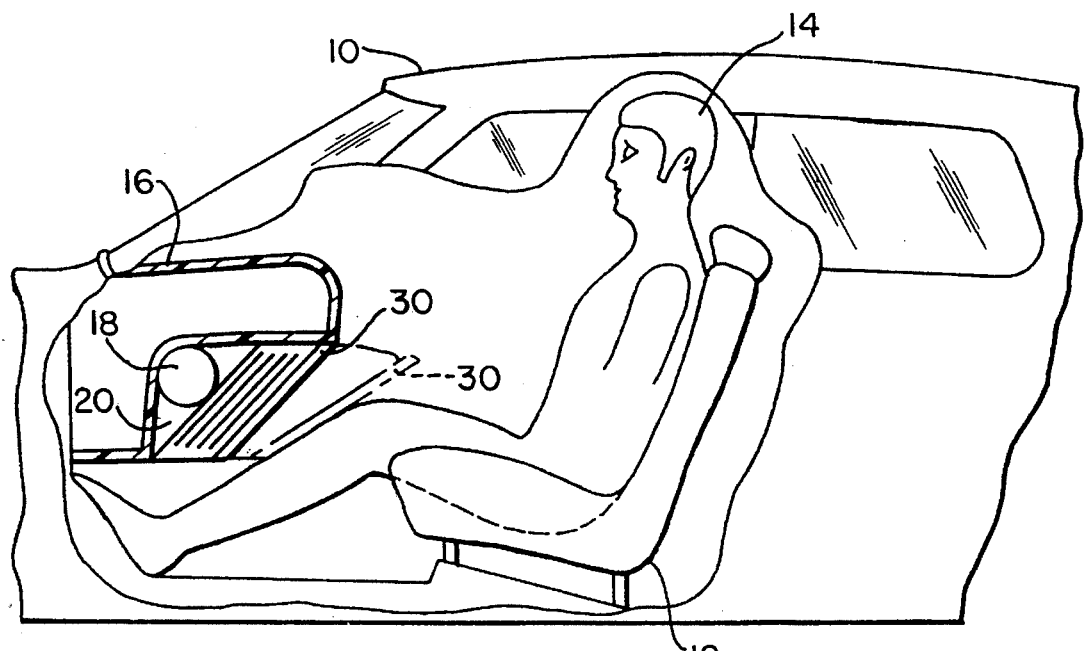
FIG. 1 is a side elevational view partially broken away of a motor vehicle having an occupant sitting therein illustrating an airbag knee bolster device in accordance with the present invention with the bolster device being shown in a stored position and in phantom in an operative position.

Referring now to FIG. 1, a vehicle 10 includes a front seat 12 which is adapted to support an occupant 14 in a seated position. The vehicle includes an instrument panel 16 housing a compartmentalized airbag knee bolster device, referred to generally with the reference numeral 20. An inflator 18 is incorporated in the airbag knee bolster unit 20 for providing a source of fluid pressure when the inflator is activated, and which pressurized fluid is used to inflate an airbag of the airbag knee bolster unit 20.

Figure 3:
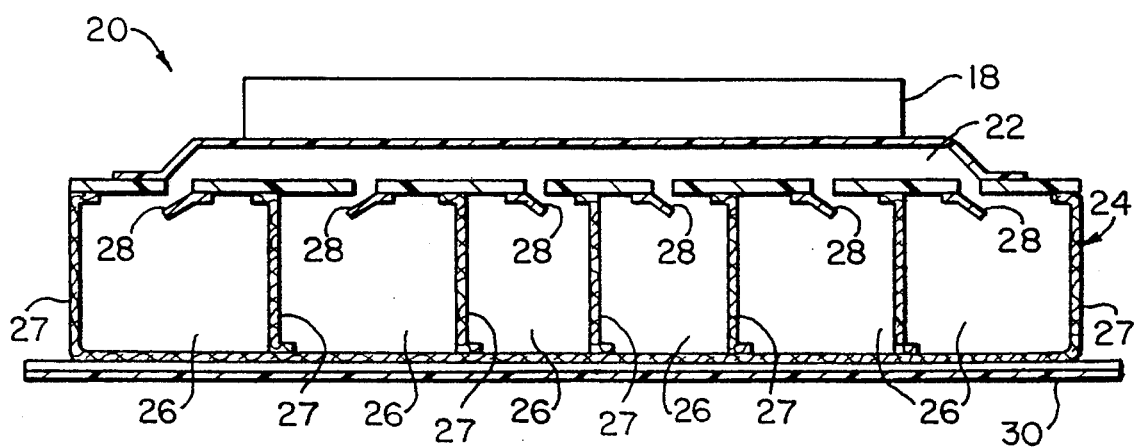
FIG. 3 is a top cross-sectional view of the compartmentalized airbag knee bolster device of FIG. 2 during expansion of the compartmentalized bag by pressurized gas.

As will best be seen in FIGS. 2 and 3, the airbag knee bolster unit 20 includes the inflator 18 and a plenum chamber 22 which is adapted to be pressurized by gas from inflator 18. A compartmentalized airbag 24 includes a plurality of compartments 26 separated by membranes 27, each having a one-way valve 28 in communication with the plenum chamber 22. The width of the individual compartments will generally not be much greater than the width of a vehicle occupant's knees and may be less than the width of said knees. The one-way valves 28 can be of any suitable structure, but may be as simple as a piece of semi-rigid material firmly attached to one side of a wall of the plenum chamber 22. The one-way valves permit flow of pressurized gas from the plenum chamber 22 into compartments 26 and prevent flow of gas from compartments 26 to plenum chamber 22.

A knee bolster panel 30 is provided on the vehicle occupant's or driver's side of the unit 20. That is, the knee bolster panel may be facing the driver, center seat or passenger side occupant of the vehicle. As shown in FIGS. 2 and 3, bolster panel 30 may be attached to the front, i.e. vehicle occupant side, of the compartmentalized airbag 24 by any suitable attachment means, such as by an adhesive or heat staking means. Alternatively, the bolster panel 30 may be disposed in front of the compartmentalized airbag 24 by being appropriately placed by attachment to the vehicle's instrument panel 16, such as for example, by way of a hinged connection 32 between the instrument panel 16 and the bolster panel 30 as shown in FIG. 4.

As illustrated in FIG. 2, in its stored, inactivated state, the compartmentalized airbag 24 has compartment membrane walls 27 stored in folded array. In operation, upon the initiation or activation of the inflator 18 which is attached to the plenum chamber 22, gas from the inflator 18 flows out of the inflator 18 and into the plenum chamber 22, thereby pressurizing the plenum chamber 22. As the gas pressure increases in the plenum chamber 22, the one-way valves 28 open and allow the gas to flow into each of the plurality of compartments 26 of the airbag 24. The flow of pressurized gas in compartments 26 causes compartments 26 to inflate, unfolding membrane walls 27, as shown in FIG. 3. Gas will fill each compartment 26 to an equal pressure. The valves 28 will close upon the equalization of the pressure in plenum chamber 22 with the pressure in the compartments 26. While pressure in the plurality of compartments 26 is below that of the pressure in the plenum chamber, the valves 28 remain open and only close when the pressure in the compartments 26 is at least equal to the pressure in the plenum chamber 22. Thus, the value 28 are open only when the airbag is in the process of inflation. During storage and at full deployment, the values 28 are closed as shown in FIG. 2.

As illustrated in FIG. 2, a knee bolster panel 30 is attached to the front end of the compartmentalized airbag i.e. opposite the end of the airbag in contact with the plenum chamber 22 and the end of the airbag 24 facing the vehicle occupant 14. In such a position, when the compartmentalized airbag 24 is inflated, as shown in FIG. 3, the knee bolster panel 30 is caused to translate forward and contact the knees as illustrated in phantom in FIG. 1. Since a knee bolster panel may run the entire length of the instrument panel 16 from the passenger side front door across the middle passenger seat location, contacts of the knees of an occupant 14 with such a knee bolster panel would ordinarily cause gas to flow away from the point of contact and so reduce the effectiveness of a previously utilized single compartment airbag. However, in the present invention, as the knees of the occupant contact the knee bolster panel 30 in close proximity to any of the airbag compartments the gas in those contacted compartments is forced to remain in that particular compartment area due to the one-way valves Accordingly, gas is thus prevented from flowing out of the contacted compartments 26 thereby maintaining or increasing the rigidity of the airbag compartment in the area of contact. This results in stopping the translation of an occupant's knees sooner than would be the case if the gas in the contact area was able to flow out of the compartment in the area of contact or permitted to flow away from the contact area as in a single compartment airbag of the prior art.

In the embodiment shown in FIG. 4 the knee bolster panel 30A, provided with a tear or split line 34, can be attached to the instrument panel. Thus, when the compartmentalized airbag 24 is actuated, knee bolster panel 30A will split at tear line 34 and swing open in the direction of the arrows 36, as shown in phantom, and thereby permit the compartmentalized airbag 24 to contact the occupant's knees directly. The result is generally the same. In the case of the embodiment of FIG. 4, the compartmentalized airbag 24 directly engages the occupant's knees which results in increased rigidity of the compartments 26 which are contacted by the knees of the occupant.

By providing a compartmentalized airbag knee bolster, the present invention forces gas to remain within the confines of a smaller compartmental area in proximity to where the occupant's knees are contacting the airbag, thereby improving the effectiveness of the knee bolster device of the present invention. In the case of a single compartment airbag, gas from the impacted areas would flow to other areas within the bag, lessening the rigidity in the area of impact, thus reducing the effectiveness. In the present invention, gas is not permitted to flow from one compartment to another compartment in the compartmentalized arrangement and rigidity is actually increased by the compression of the gas in the compartments in direct contact with the knees.

Since other modifications and changes varied to fit particular operating requirements and environments will be apparent to those skilled in the art, the invention is not considered limited to the examples chosen for purposes of disclosure and covers all modifications and changes which do not constitute departures from the true spirit and scope of this invention.

We claim:

1. A compartmentalized airbag knee bolster device mounted to the instrument panel of a motor vehicle comprising:

an inflator for providing pressurized gas upon actuation of the inflator;

a plenum chamber having said inflator attached thereto such that when the inflator is activated, gas from the inflator flows into and pressurizes said plenum chamber;

a compartmentalized airbag having a plurality of compartments in communication with the plenum chamber;

a plurality of one-way valves mounted to said compartmentalized airbag and providing for communication of said pressurized gas from said plenum chamber to each of said compartments;

a knee bolster panel mounted on a vehicle occupant side of said compartmentalized airbag and opposite said plenum chamber with said compartmentalized airbag located between said knee bolster panel and said plenum chamber, said knee bolster panel having a tear line; and means for mounting said compartmentalized airbag knee bolster device to said instrument panel such that when said compartmentalized airbag is inflated, said inflating compartmentalized airbag causes said knee bolster panel to split along said tear line and swing open away from the inflating compartmentalized airbag.

2. The compartmentalized airbag knee bolster device as claimed in claim 6 wherein said knee bolster panel is hingedly attached to the instrument panel at two ends of said knee bolster panel.

3. A compartmentalized airbag knee bolster device mounted to the instrument panel of a motor vehicle comprising:

an inflator for providing pressurized gas upon actuation of the inflator;

a plenum chamber having said inflator attached thereto such that when the inflator is activated, gas from the inflator flows into and pressurizes said plenum chamber;

a compartmentalized airbag having a plurality of compartments in communication with the plenum chamber, each of said compartments having a width approximately equal to the width of a knee of an occupant of the motor vehicle;

a plurality of one-way valves mounted to said compartmentalized airbag and providing for communication of said pressurized gas from said plenum chamber to each of said compartments;

a knee bolster panel mounted on a vehicle occupant side of said compartmentalized airbag and opposite said plenum chamber with said compartmentalized airbag located between said knee bolster panel and said plenum chamber; and means for mounting said compartmentalized airbag knee bolster device to said instrument panel such that said knee bolster panel is adapted to contact the front of the knees of an occupant of the vehicle when the compartmentalized airbag is inflated.

4. The compartmentalized airbag knee bolster device as claimed in claim 3 wherein said knee bolster panel is mounted on the front of said compartmentalized airbag such that when the airbag is inflated, the knee bolster panel directly comes into contact with the front of the knees of an occupant of the vehicle.

5. The compartmentalized airbag knee bolster device as claimed in claim 3 wherein said knee bolster panel runs the length of the instrument panel from a passenger side front door across a middle passenger's seat.

* * * * *

UNITED STATES PATENT AND TRADEMARK OFFICE
CERTIFICATE OF CORRECTION

PATENT NO. : 5,458,366
DATED : 17 October 1995
INVENTOR(S) : Christopher Hock et al.

It is certified that error appears in the above-indentified patent and that said Letters Patent is hereby corrected as shown below:

At column 3, line 16, "the values 28" should be --the valves 28--.

At column 3, line 18, "airbag i.e." should be --airbag 24, i.e.--.

At column 3, line 24, "bolster panel" should be --bolster panel 30--.

At column 3, line 27, ", contacts" should be --. Contact--.

At column 3, line 33, "airbag compartments" should be --airbag compartments 26,--.

At column 3, line 35, "one-way valves" should be --one-way valves 28.--.

At column 4, line 38, "claim 6" should be --claim 1--.

Signed and Sealed this

Twenty-second Day of October, 1996

*Attest:*

BRUCE LEHMAN

*Attesting Officer*   *Commissioner of Patents and Trademarks*